Oct. 4, 1966  H. T. ROBINSON  3,276,156
SLIDE TRAY FOR A SLIDE PROJECTOR
Filed Feb. 23, 1962  4 Sheets-Sheet 1

Herbert T. Robinson
INVENTOR.

BY R. Frank Smith
Steve W. Grembow
ATTORNEYS

Oct. 4, 1966
H. T. ROBINSON
3,276,156
SLIDE TRAY FOR A SLIDE PROJECTOR
Filed Feb. 23, 1962
4 Sheets-Sheet 2
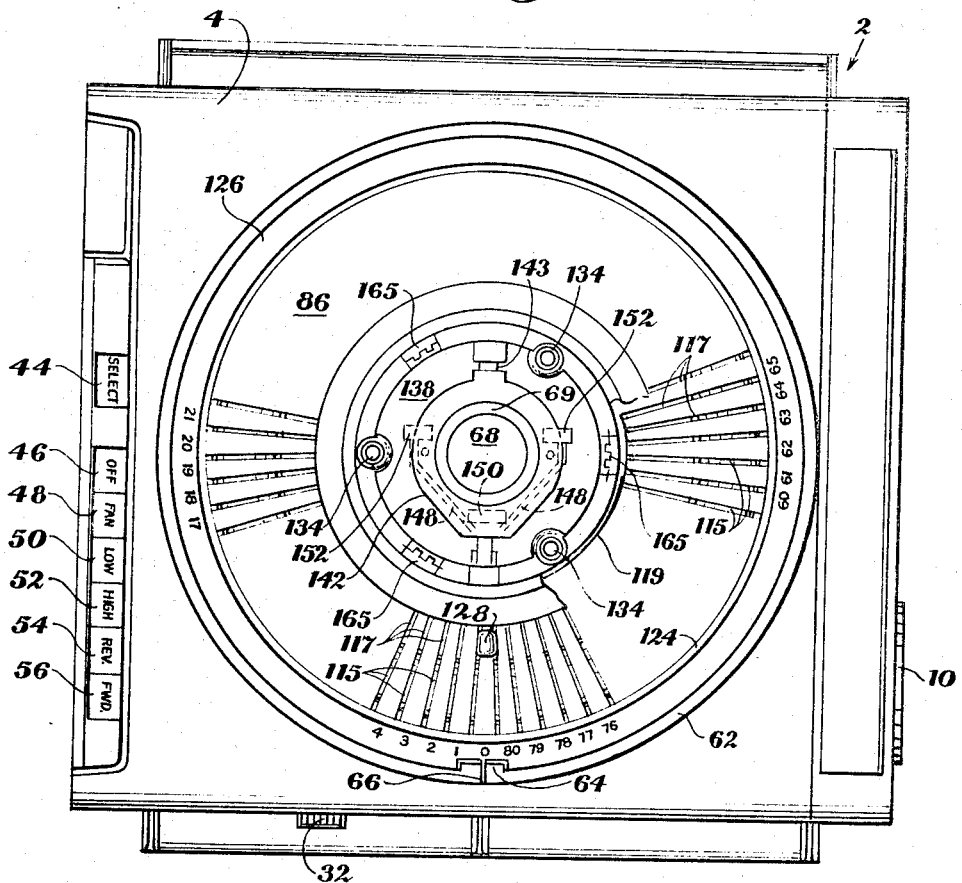
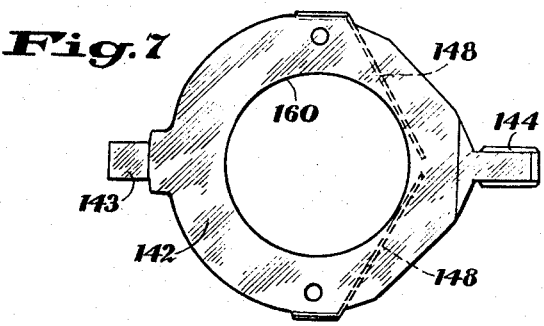
Herbert T. Robinson
INVENTOR.
BY
ATTORNEYS

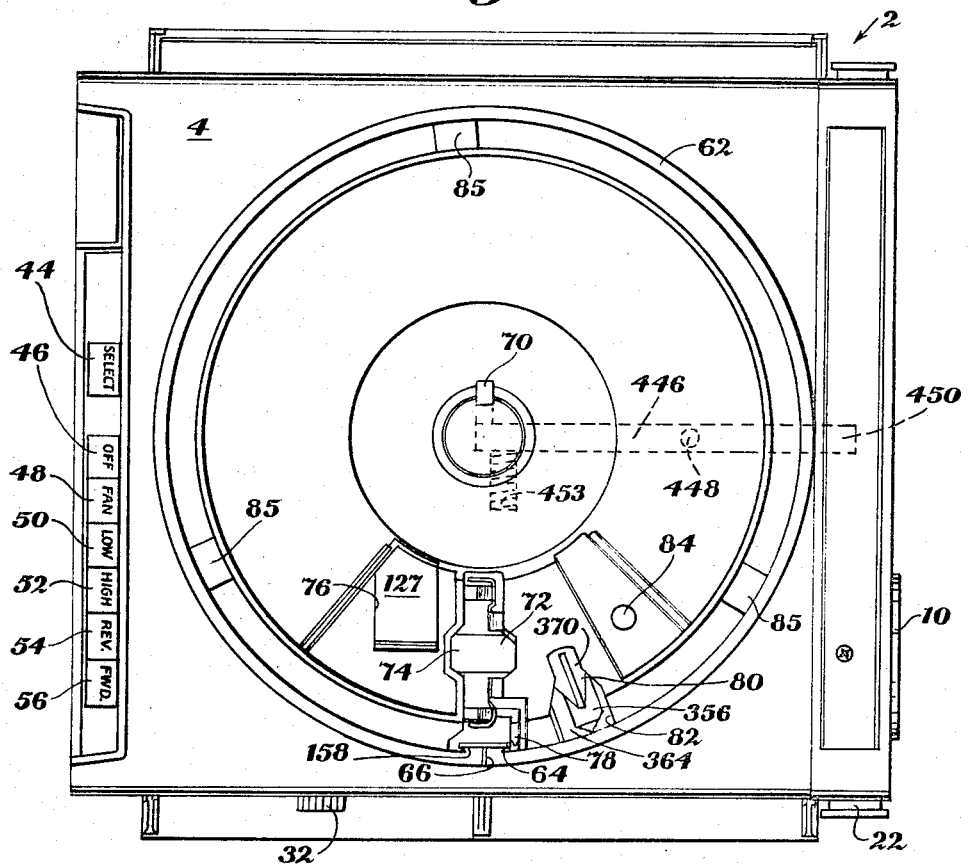

Oct. 4, 1966 H. T. ROBINSON 3,276,156
SLIDE TRAY FOR A SLIDE PROJECTOR
Filed Feb. 23, 1962 4 Sheets-Sheet 4

Herbert T. Robinson
INVENTOR.

BY
ATTORNEYS

United States Patent Office 3,276,156
Patented Oct. 4, 1966

3,276,156
SLIDE TRAY FOR A SLIDE PROJECTOR
Herbert T. Robinson, Rochester, N.Y., assignor to Eastman Kodak Company, Rochester, N.Y., a corporation of New Jersey
Filed Feb. 23, 1962, Ser. No. 175,216
16 Claims. (Cl. 40—79)

This invention relates generally to slide projectors, and more specifically to an improved slide tray for a slide projector.

This invention includes within its scope an improved slide tray for a slide projector having a slide support member with a slot therein releasably mounted on the projector, a compartmented member for slides connected to the slide support member for slidable movement relative to the slide support member to sequentially bring each compartment into register with the slot so that the slide contained therein may be fed through the slot, a detent means releasably holding the members together in a slide storing position in which one compartment is in register with the slot, and a bridge over the one compartment to prevent the entry of a slide therein from one side.

One of the objects of this invention is to provide an improved circular slide tray for a slide projector.

A more specific object of the invention is to provide a circular slide tray mountable on top of a projector, and adapted upon rotation of a portion thereof to feed the slides in succession by gravity to the slide-viewing position.

A further object of the invention is to provide an improved slide projector having a slide tray mounted on the top thereof in an unobstructed position where it is easily accessible for slide editing and removal, and in which the slide compartment members and film gate index are in clear view at all times.

Another object of the invention is to provide an improved slide tray for a gravity slide feed projector.

Still another object of the invention is to provide a slide projector having a circular slide tray adapted to accept glass, metal or plastic mounts.

Another object of the invention is to provide an improved slide tray that is of simple design and construction, thoroughly reliable and efficient in operation, and economical to manufacture.

Objects and advantages other than those set forth above will be apparent from the following description when read in connection with the accompanying drawings, in which:

FIG. 3 is a top plan view of the slide projector of FIG. 1 with a slide tray mounted thereon;

FIG. 4 is a view similar to FIG. 3, with the slide tray removed;

FIG. 7 is a bottom view of the slide tray latch apart from the slide tray;

FIG. 8 is a side elevation view of the latch of FIG. 7; and

FIG. 9 is a side elevation view in section of the slide retaining ring of the slide tray.

With respect to general function, the improved slide projector of this invention may be operated by either automatic or manual control means of the same general type disclosed in U.S. Patent No. 2,969,711. The slide projector has means mounted on top thereof for holding a plurality of slides which are to be projected, and means for cyclically indexing the slide holding means in a forward or reverse direction by the automatic or manual means for bringing successive slides in register with a projection gate. The slide in register with the gate is lowered under the influence of gravity by a slide transport means into a viewing position in alignment with the optic system of the projector for projection. During a cycle of operation of the projector, a projected slide, if any, is returned to the slide holding means, the slide holding means indexed, and a different slide lowered by the slide transport means into the viewing position. This projector further has a half-cycle position for editing and random projection in which the slide transport means returns the projected slide, if any, to the slide holding means and is retained in that position. In addition, the indexing means is disabled in the half-cycle position. Consequently, the operator may edit the returned slide or manually move the slide holding means to any desired position for projecting the selected slide upon completion of the cycle of operation.

Figure 1:
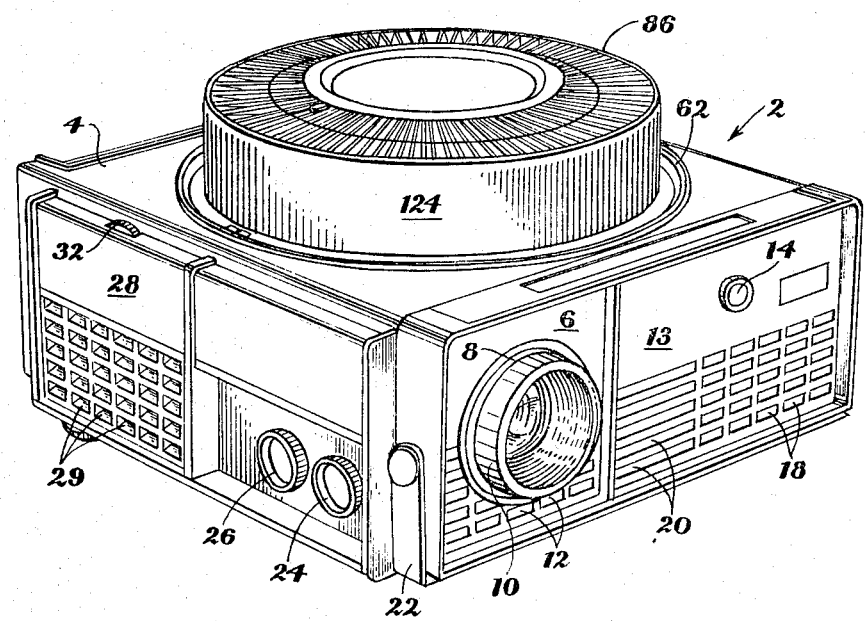
FIG. 1 is a perspective view of an automatic slide projector built in accordance with this invention.
Figure 2:
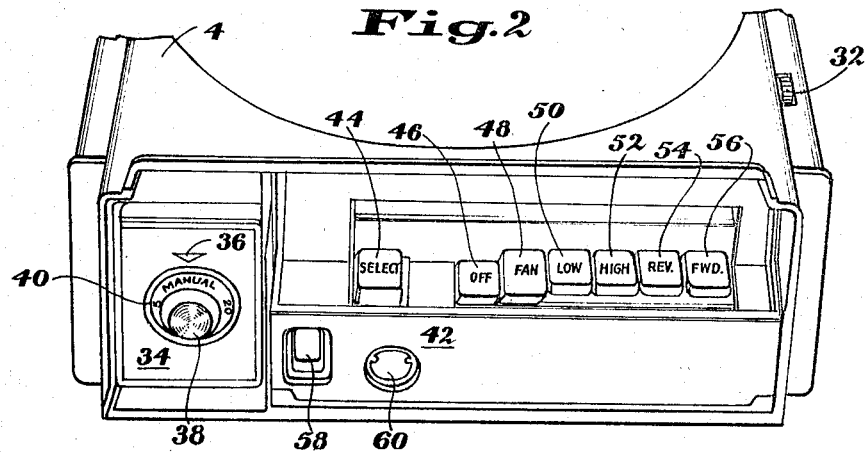
FIG. 2 is a fragmentary, rear elevation perspective view of the projector of FIG. 1.

More specifically, as shown in the drawings, preferably FIGS. 1 and 2, a preferred embodiment of the invention is incorporated in a slide projector 2 having a rectangularly shaped cast frame 4. The front of the projector 2 has a plate 6 secured thereto having a central opening 8 through which a lens barrel 10 extends. The plate 6 further has ventilating slots 12 therein for the passage of air. The front of the projector further has a door 13 pivotally secured to frame 4 and movable by knob 14 into an open position to provide access to a cord-storage compartment. The door 13 further has ventilation openings 18 and louvers 20 through which air is exhausted from the projector. A U-shaped handle 22 is pivotally secured to frame 4 to facilitate carrying the projector 2.

The left side of the projector as seen in FIG. 1 has a focus knob 24 and an elevation knob 26, and further has a cover 28 over an optics compartment. Cover 28 has louvers 29 therein and is secured to frame 4 by means of a screw 32. The rear of projector 2 as seen in FIG. 2 has a cover plate 34 secured thereto having an index mark 36 for indicating the operating position of a control knob 38. The knob 38 has four positions designated on a flange 40 thereof, one of which is designated "manual" in which the operation of the projector is manually controlled by the operator. The three remaining positions may be designated with numbers indicating intervals between slide changes in automatic operation, for example, the projector may be set by this knob to automatically project each slide for respective 5, 10, or 20-second intervals.

Another plate 42 is secured to the rear of frame 4 and has openings through which push buttons extend for controlling various projector operations. Button 44 controls the editing and random selection projection and is designated the "select" button. Button 46 is designated the "off" button and controls the power to the projector. Button 48 is designated the "fan" button and controls the operation of a projector motor 47 which drives a fan, not shown. Button 50 controls the power to a projector lamp 51, and is designated the "low" button because it provides a low power illumination, e.g., 300-watt lamp brilliance, by virtue of a resistor in the circuit. Button 52 also controls projector lamp 51, and is designated the "high" button because it provides a higher power illumination, e.g., 500-watt lamp brilliance, by by-passing the aforementioned resistor. Button 54 is designated the "rev." button and controls the operation of a slide tray 86 in a reverse direction. Button 56 is designated the "fwd." button and controls the operation of slide tray 86 in the forward direction. The plate 42 further has openings to provide access to a power cord receptacle 58 and a remote control receptacle 60.

The top of projector frame 4 has a circular inner rim 62, seen best in FIG. 3, having a lip 64 carrying an index mark 66. The top of frame 4 further has (1) an upwardly projecting central spindle 68 having a beveled top 69, and an opening, not shown, through which a spring-biased spindle key 70 extends, (2) an opening 72 (FIG. 4) in register with a slide gate 74, and (3) an opening 76 through which warm air is directed over a plurality of slides in slide tray 86 for "prepopping" the slides before projection. A tray locating projection 78 extends through a portion of opening 72, and an indexing pawl 80 extends through an opening 82 in frame 4. In addition, the top of frame 4 has an opening through which extends a locating pin 84 (to be referred to below in connection with opening 140), and a plurality of nylon inserts 85 (or other bearing surfaces) for supporting tray 86.

The circular slide tray 86 is releasably mounted on spindle 68 within rim 62 and is adapted when indexed in one direction or the other to introduce a slide by gravity into slide gate 74 and into a slide-viewing position in which the slide is in the optical axis of the projector. The magazine is manually or automatically cyclically indexed in the forward or reverse direction by incremental distances corresponding to the spacing of successive slide tray compartments. A slide changing cycle of the projector generally comprises lifting a slide, if any, from its viewing position back into the tray compartment, indexing tray 86 an incremental distance, and permitting the next slide to be lowered by gravity into the viewing position.

The slide tray 86 as seen best in FIGS. 1, 3, 5–8 and 9 comprises a cylindrical molded portion having concentric plastic shells 119, 124 (see FIG. 3). One end of shell 119 is closed off to form a base 131, and the tops of shells 119, 124 are joined together by spacers or separators 117 to form a plurality of spaced compartments for slides. In the embodiment shown, there are eighty-one equally spaced compartments. Each spacer 117 has a notch 115 therein to facilitate the insertion and removal of slides into and out of the compartments. The outer shell 124 has a peripheral rim 126 containing raised numerals as shown in FIG. 3, corresponding to and designating the compartments. Corresponding indexing means, in this embodiment pins 129 (FIG. 6), depend from rim 126. The "O" compartment, which is not a slide holding or storing compartment, has a bridge 128 extending thereacross to prevent the insertion of a slide therein from the top for a purpose to be explained hereinafter. All of the remaining compartments are slide storing compartments, and are open at both the top and the bottom.

Figure 5:
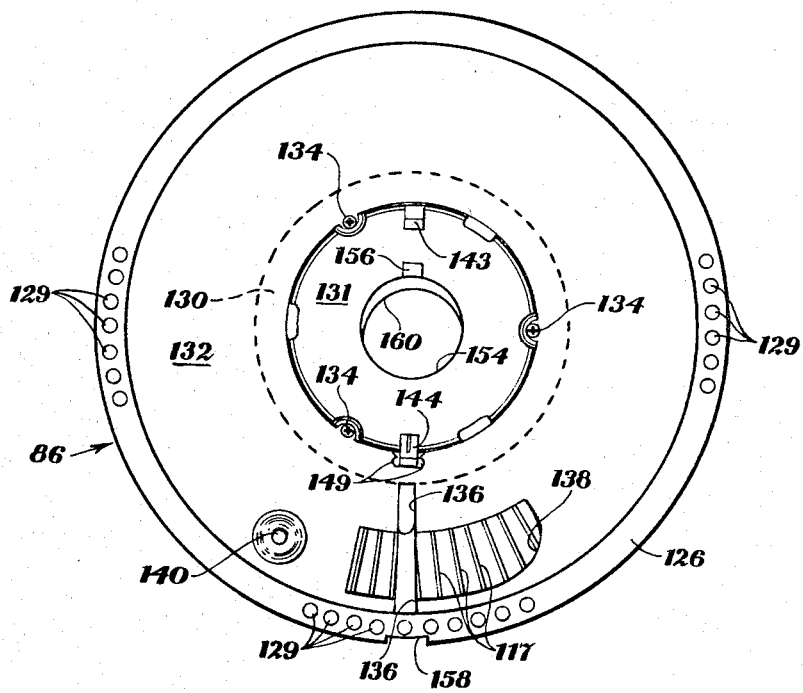
FIG. 5 is a bottom view of the slide tray.
Figure 6:
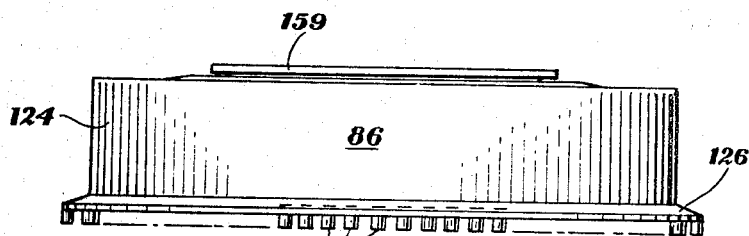
FIG. 6 is a side elevation view of the slide tray of FIG. 5.

The outer periphery of base 131 of the molded portion of slide tray 86 provides an annular shoulder 130 as seen in FIG. 5 for supporting another plate-like portion of slide tray 86 shown as an annular slide supporting metal disc 132. The disc is rotatable on shoulder 130, and is rotatably retained thereon by the heads of three screws 134 which extend over the inner periphery of disc 132. Disc 132 further has an opening 138 through which heated air expelled from projector opening 76 is directed when the tray 86 is properly mounted on projector 2 for operation, for circulating heated air over the slides for preheating the slides in tray 86. Opening 138 has radially extending notches 136 co-operating therewith to form a passageway for uncovering the slide compartments one at a time during relative movement of the disc 132 and shoulder 130 of tray 86, and through which the slides can pass from tray 86 to a slide gate 74. At this point, it should be noted that if bridge 128 were omitted, any slide introduced into the "O" compartment would fall out of slide tray 86 through the passageway when the slide tray is in a normal, slide storing position, in which the "O" compartment is in alignment with the passageway. The bridge 128, in effect, disables the passageway 136 when the slide tray is in its normal position by blocking it off, thereby preventing the introduction of a slide into the "O" compartment and consequent feeding of the slide through passageway 136.

Disc 132 further has an opening 140 adapted to co-operate with pin 84 for fixedly positioning disc 132 on projector 2 as will be explained hereinafter.

Detent means are provided for releasably holding slide tray 86 in its normal position for holding slides. The detent means are shown as a metal latch 142 as best seen in FIGS. 7 and 8 having oppositely extending tabs 143, 144 slidably movable in complementary openings, not shown, in base 131, which guide the latch for reciprocal movement in a radial direction. The latch 142 further has a pair of spring fingers 148, one end of which are adapted to co-operate with a shoulder 150 of base 131 to urge latch 142 to a latched position in which tab 144 enters a pair of spaced notches 149 along the inner periphery of disc 132 for releasably holding the disc in a fixed position with respect to base 131. In this position, the passageway formed by notches 136 in disc 132 is in register with the "O" compartment. The opposite ends of fingers 148 co-operate with abutments 152 of base 131 which provide a stop for latch 142 when moved to its unlatched position.

The base 131 has a central opening 154 (FIG. 5) having a notch 156 along its inner periphery in alignment with tabs 143, 144, and further in alignment with a notch 158 in rim 126 at the location of the "O" compartment as best seen in FIG. 5. The latch 42 also has an opening 160 which is offset out of alignment with opening 154 when in the latched position, but is in register with opening 154 in the unlatched position. When slide tray 86 is initially placed on top of frame 4, spindle 68 extends through openings 154, 160, and rim 126 of tray 86 will bear on lip 64, and base 131 on key 70 allowing manual rotation of tray 86 by the operator. The tray is rotated until notches 156, 158 align with key 70 and lip 64 respectively, and are received thereby, causing tray 86 to drop until pins 129 engage inserts 85. As tray 86 drops into engagement with inserts 85, beveled portion 69 of spindle 68 cams latch 142 into its unlatched position. The tray 86 is now in a proper loaded position with the "O" compartment in register with index 66. Also, in this position pin 84 extends through disc opening 140 for fixedly positioning disc 132 with notches 136 of its slide passageway in register with gate 74.

During projection, disc portion 132 remains fixed and the molded portion comprising shells 119, 124, base 131 and spacers 117 is indexed as a unit relative thereto to successively bring the slides in register with the disc passageway. The passageway 136 uncovers each slide compartment in succession as it is moved into register with the passageway enabling the slide contained in the compartment to drop by gravity into slide gate 74. With disc 132 releasably held by latch 142, the operator is in a position to load slide tray 86 with cardboard, glass, metal, plastic or any other suitable type slides which fit within the spaces between spacers 117. The slides are retained in the compartments by a slide-retaining cover ring 159, as seen in FIG. 9, of molded plastic or other suitable material. This cover fits within shell 119 and has a peripheral flange 161 which overlaps the slide compartments to prevent the slides from falling out if the slide tray assembly is tipped upside-down, as in storage, or otherwise. The ring 159 has three angularly spaced, stepped ramps 163 which twistlock on corresponding lugs 165 (FIG. 3) located on the inner periphery of shell 119. When rotated in one direction, the ring 159 locks to retain the slides in slide tray 86, and when rotated in the opposite direction, it may be removed from tray 86 for slide editing or loading.

Since slide tray 86 is circular, the projector is naturally adapted for continuous repeater operation. All the operator need do is move control knob 38 to a selected automatic time-interval position of 5, 10 or 20 seconds and continuous repeating operation is achieved. If the operator wishes to show 81 slides, or have a title slide, or to interpose a thin piece of cardboard for blocking the light projection after or before all the slide trays have been projected, the slide, title slide, or cardboard must be pushed into gate 74 into the viewing position by the operator before slide tray 86 is assembled on the projector 2. During operation of the projector 2, the slide, title slide or cardboard will be lifted into the "O" or blocked-off compartment in slide tray 86 and will be lowered into gate 74 when the slide tray reaches its original starting position. The slide, title slide, or cardboard will remain in gate 74 when slide tray 86 is removed.

As indicated earlier, when slide tray 86 is properly positioned on the projector 2, notches 158 and 156 are aligned with lip 64 and spindle key 70 respectively. After the first cycle of operation, the operator is prevented from removing slide tray 86 from projector 2 by the interaction between rim 126 and lip 64, and between key 70 and the inner periphery 154 of base 131. If the slide-changing mechanism should become inoperative for any reason, the operator may remove slide tray 86 from projector 2 by means of an emergency lever 446 (see dotted in FIG. 4) pivoted at 448 to the underside of frame 4 and having a handle 450 extending through a slot, not shown, in the side of frame 4 and accessible for manual movement by the operator on opening the storage compartment door 28. The key 70 is integral with the opposite end of lever 446, and a spring 452 interposed between lever 446 and frame 4 moves the key outwardly into its normal position. Once slide tray 86 has been removed in this manner, the latch 142 on base 131 of the tray is no longer in engagement with notches 149 in disc 132 and hence is unlatched. The operator must turn disc 132 until it is latched to base 131, remove the defective slide or foreign object causing the slide-changing mechanism to become inoperative, and then replace the slide tray on the projector.

The invention has been described in detail with particular reference to the preferred embodiment thereof, but it will be understood that variations and modifications can be effected in the scope of the invention as described hereinabove and as defined in the appended claims.

I claim:
1. In a circular slide tray for interchangeable use in a slide projector, the combination comprising:
   a first member having a plurality of slide compartments disposed adjacent one another, each of said slide compartments having a slide-discharge opening disposed adjacent to one side of said first member;
   a second member rotatably mounted adjacent said one side of said first member for relative movement with respect to said first member, the outermost periphery of said second member being disposed within the outermost periphery of said first member, at least a portion of a surface of said second member being adapted to support said slides during the relative movement of said first and second members on the slide projector, said second member having means for uncovering one slide compartment at a time to release the slide contained therein; and
   detent means for said members and movable between an operative position, in which said members are releasably held together for holding said slides, and an inoperative position, in which said detent is disabled and said members are movable relative to one another for releasing said slides in succession through said slide compartment uncovering means.

2. In a slide tray, the combination comprising:
   a first member having slide compartments open at least at one end thereof;
   said first member having a blocked portion extending across one of said slide compartments to prevent the introduction of a slide into said one slide compartment, said blocked portion providing a reference for the sequence of said compartments;
   a second member;
   said first and second members being connected together for relative movement with respect to one another, said second member extending across at least a portion of said open end of each of a plurality of said slide compartments for releasably holding a plurality of slides in said plurality of slide compartments; and
   said second member having a passageway extending therethrough for uncovering said open end of each of said slide compartments in succession upon relative movement of said first and second members to release the slides contained therein.

3. The invention according to claim 2 wherein said blocked portion comprises a bridge extending across said one slide compartment.

4. In a circular slide tray for interchangeable use in a slide projector, the combination comprising:
   a first member having a plurality of slide compartments disposed adjacent to one another, each of said slide compartments having a slide-discharge opening disposed adjacent to one side of said first member;
   a second member rotatably mounted adjacent said one side of said first member for relative movement with respect to said first member, the outermost periphery of said second member being disposed within the outermost periphery of said first member, at least a portion of a surface of said second member being adapted to support said slides during the relative movement of said first and second members on the slide projector, said second member having a passageway for uncovering one slide compartment at a time to release the slide contained therein; and
   detent means for said members and movable between an operative position, in which said members are releasably held together for holding said slides, and an inoperative position, in which said detent is disabled and said members are movable relative to one another for releasing said slides in succession through said slide compartment uncovering means,
   said detent means comprising a movable projection supported by one of said members, and means for biasing said projection into interlocking engagement with the other of said members.

5. In a slide tray for interchangeable use in a slide projector, the combination comprising:
   a first member comprising continuous inner and outer concentric walls, and separators interconnecting said walls to form slide compartments;
   a second member comprising an annular disc movable relative to said first member and cooperating therewith to releasably hold a plurality of slides, said second member having means for uncovering one slide compartment at a time to release the slide contained therein; and
   detent means for said members and movable between an operative position, in which said members are releasably held together for holding said slides, and an inoperative position, in which said detent is disabled and said members are movable relative to one another for releasing said slides in succession through said slide compartment uncovering means.

6. In a slide tray for interchangeable use in a slide projector, the combination comprising:
   a first member comprising continuous inner and outer concentric walls, and separators interconnecting said walls to form slide compartments;
   a second plate-like member movable relative to said first member and cooperating therewith to releasably hold a plurality of slides, said plate-like member having means for uncovering one slide compartment at a time to release the slide contained therein; and
   detent means for said members and movable between an operative position, in which said members are releasably held together for holding said slides, and an inoperative position, in which said detent is disabled and said members are movable relative to one another for releasing said slides in succession through said slide compartment uncovering means.

7. The invention according to claim 6 wherein said plate-like member has a radially extending passageway, and one of said slide compartments has a bridge extending across it at its upper end, said one slide compartment further being in register with said passageway when said detent means is in its operative position.

8. In a slide tray for interchangeable use in a slide projector, the combination comprising:
a first member comprising continuous inner and outer concentric walls, and separators interconnecting said walls to form slide compartments;
a second plate-like member movable relative to said first member and cooperating therewith to releasably hold a plurality of slides, said plate-like member having a passageway for uncovering one slide compartment at a time to release the slide contained therein; and
detent means for said members and movable between an operative position, in which said members are releasably held together for holding said slides, and an inoperative position, in which said detent is disabled and said members are movable relative to one another for releasing said slides in succession through said slide compartment uncovering means.

9. In a slide tray for interchangeable use in a slide projector, the combination comprising:
a first member comprising inner and outer walls concentric about a common axis, and separators interconnecting said walls to form slide compartments, said inner wall further being partially closed off at one end to form a base extending inwardly toward said axis;
a second member comprising an annular disc having an inner periphery which is slidably movable on said base and cooperates with said first member to releasably hold a plurality of slides, said second member having means for uncovering one slide compartment at a time to release the slide contained therein; and
detent means for said members and movable between an operative position, in which said members are releasably held together for holding slides, and an inoperative position, in which said detent is disabled and said members are movable relative to one another for releasing said slides in succession through said slide compartment uncovering means.

10. The invention according to claim 9 wherein said inner periphery of said annular disc has a notch, said base supports said detent means and said detent means comprises a movable projection supported by said base, and means for biasing said projection into interlocking engagement with said notch.

11. The invention according to claim 9 wherein said inner periphery of said annular disc has a notch, said base supports said detent means, and said detent means comprises a plate having oppositely disposed tabs slidably supported by said base, one of said tabs further having a projection, and means for biasing said projection into interlocking engagement with said notch.

12. In a circular slide tray, the combination comprising:
a first member comprising inner and outer concentric walls, and separators extending from one of said walls toward the other wall to form slide compartments, and means on said first member adjacent the periphery thereof by which said first member may be indexed;
said first member having a blocked portion extending across one of said slide compartments to prevent the introduction of a slide into said one slide compartment, said block portion providing a reference for the sequence of said compartments;
a second member;
said first and second members being connected together for relative movement with respect to one another, said second member extending across at least a portion of said open end of each of a plurality of said slide compartments for releasably holding a plurality of slides in said plurality of slide compartments; and
said second member having a passageway extending therethrough for uncovering said open end of each of said slide compartments in succession upon relative movement of said first and second members to release the slides contained therein.

13. The invention according to claim 12 wherein said outer wall has a peripheral flange adapted to carry indicia correlated with said compartments, and wherein said means on said first member comprises a plurality of pins.

14. A slide tray for interchangeable use in a slide projector, comprising:
a first member comprising spaced-apart walls and separators extending from one of said walls toward the other wall to form a plurality of slide compartments, each compartment having a slide-discharge opening at one end;
a second member connected to said first member for movement relative thereto and cooperating therewith to releasably hold a plurality of slides, said second member being provided with a passageway arranged to be brought into selective alignment with the slide-discharge opening of each of said compartments in response to the relative movement of said first and second members;
said second member, when said passageway is aligned with the slide-discharge opening of any selected compartment, cooperating with said first member to prevent passage of a slide through the slide-discharge opening of any other of said compartments;
one of said compartments having a blocked-portion for preventing the passage of a slide therethrough; and
detent means for releasably holding said members in a position wherein said passageway is aligned with the discharge opening of said one compartment.

15. The invention according to claim 14 wherein said slide tray further includes a detachably mounted retaining means adapted to overlie the other end of each of said slide compartments for preventing slides from escaping from said compartments.

16. The invention according to claim 15 wherein said retaining means comprises an annular ring.

References Cited by the Examiner
UNITED STATES PATENTS

| | | | |
|---|---|---|---|
| Re. 25,115 | 1/1962 | Boughton et al. | 40—79 |
| 989,969 | 4/1911 | Helm | 40—36 |
| 1,328,106 | 1/1920 | Stone | 70—69 |
| 1,768,111 | 6/1930 | Branger | 88—27 |
| 2,076,924 | 4/1937 | Spindler | 88—28 X |
| 2,537,429 | 1/1951 | Seyler | 88—27 |
| 2,748,653 | 6/1956 | Pollan et al. | 88—27 |
| 2,931,116 | 4/1960 | Boughton et al. | 40—79 |
| 2,938,287 | 5/1960 | Bernabei | 40—36 |
| 2,949,814 | 8/1960 | Boughton et al. | 88—28 |
| 2,998,750 | 9/1961 | King | 88—28 |
| 3,045,816 | 7/1962 | King | 206—73 |
| 3,146,666 | 9/1964 | Misuraca | 88—28 |
| 3,187,890 | 6/1965 | Brown | 206—73 |

FOREIGN PATENTS

| | | |
|---|---|---|
| 1,112,651 | 8/1961 | Germany |

JEROME SCHNALL, *Primary Examiner.*

EMIL G. ANDERSON, LAWRENCE CHARLES, EUGENE R. CAPOZIO, HAROLD H. FLANDERS, WILLIAM H. GRIEB, *Assistant Examiners.*